(12) United States Patent
Kakeya et al.

(10) Patent No.: US 9,748,560 B2
(45) Date of Patent: *Aug. 29, 2017

(54) NEGATIVE ELECTRODE FOR ALKALINE SECONDARY BATTERY, OUTER CASE FOR ALKALINE SECONDARY BATTERY AND ALKALINE SECONDARY BATTERY

(71) Applicant: GS Yuasa International Ltd., Kyoto-shi, Kyoto (JP)

(72) Inventors: Tadashi Kakeya, Kyoto (JP); Manabu Kanemoto, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,295

(22) Filed: Nov. 8, 2016

(65) Prior Publication Data

US 2017/0054142 A1    Feb. 23, 2017

Related U.S. Application Data

(63) Continuation of application No. 14/234,461, filed as application No. PCT/JP2012/069240 on Jul. 27, 2012.

(30) Foreign Application Priority Data

Jul. 28, 2011    (JP) .................................. 2011-165689
Sep. 16, 2011    (JP) .................................. 2011-203202

(51) Int. Cl.
  *H01M 4/24*    (2006.01)
  *H01M 4/38*    (2006.01)
  (Continued)

(52) U.S. Cl.
  CPC ............ *H01M 4/242* (2013.01); *H01M 4/134* (2013.01); *H01M 4/24* (2013.01); *H01M 4/36* (2013.01);
  (Continued)

(58) Field of Classification Search
  CPC .......... H01M 4/24; H01M 4/62; H01M 4/242; H01M 4/36; H01M 4/661; H01M 4/134;
  (Continued)

(56) References Cited

U.S. PATENT DOCUMENTS 3,671,319 A    6/1972  Arrance
4,938,780 A    7/1990  Kaiya et al.
(Continued)

FOREIGN PATENT DOCUMENTS

JP    61-008848    1/1986
JP    61-190861    8/1986
(Continued)

OTHER PUBLICATIONS

English translation of JP Publication 2002-117858, Apr. 2002.*
(Continued)

*Primary Examiner* — Brittany Raymond
(74) *Attorney, Agent, or Firm* — Rankin, Hill & Clark LLP

(57) ABSTRACT

Disclosed is a negative electrode for an alkaline secondary battery, which can suppress elution of iron to improve the long-period storage property of the battery capacity even under conditions in which elution of iron in a substrate into an electrolyte solution tends to occur, and which can also suppress lowering of initial capacity and increase in internal resistance. Even under conditions in which the elution of iron in the substrate into an electrolyte solution tends to occur, including a case where there is a thin conductive protecting layer at the surface or where the conductive (Continued)

protecting layer has defects, by adding magnesium or a magnesium compound to the negative electrode for an alkaline secondary battery (excluding the case where magnesium is contained as a constituent element of a hydrogen storage alloy), the elution of iron can be suppressed, and thereby, the long-period storage property of the battery capacity can be improved and the lowering of the initial capacity and the increase in internal resistance can be suppressed.

15 Claims, 5 Drawing Sheets

(51) Int. Cl.
H01M 4/62 (2006.01)
H01M 4/66 (2006.01)
H01M 10/24 (2006.01)
H01M 4/36 (2006.01)
H01M 4/134 (2010.01)

(52) U.S. Cl.
CPC .......... *H01M 4/383* (2013.01); *H01M 4/62* (2013.01); *H01M 4/628* (2013.01); *H01M 4/661* (2013.01); *H01M 4/667* (2013.01); *H01M 10/24* (2013.01); *Y02E 60/124* (2013.01)

(58) Field of Classification Search
CPC ...... H01M 4/383; H01M 4/628; H01M 4/667; H01M 10/24; Y02E 60/124
See application file for complete search history.

(56) References Cited

U.S. PATENT DOCUMENTS

| | | | |
|---|---|---|---|
| 5,043,233 A | 8/1991 | Kameoka et al. | |
| 5,545,674 A * | 8/1996 | Behrmann | B01J 23/75 518/715 |
| 6,040,087 A | 3/2000 | Kawakami | |
| 6,249,940 B1 | 6/2001 | Asano et al. | |
| 6,329,101 B1 | 12/2001 | Kawakami | |
| 2005/0186478 A1 | 8/2005 | Izumi | |
| 2006/0194105 A1 | 8/2006 | Kihara | |
| 2008/0145756 A1* | 6/2008 | Taniguichi | H01M 4/624 429/206 |

FOREIGN PATENT DOCUMENTS

| | | | |
|---|---|---|---|
| JP | 61-206165 | | 9/1986 |
| JP | 62-022369 | | 1/1987 |
| JP | 63-310561 | | 12/1988 |
| JP | 63-310565 | | 12/1988 |
| JP | 01-107465 | | 4/1989 |
| JP | 02-051860 | | 2/1990 |
| JP | 02-075156 | | 3/1990 |
| JP | 02-090461 | | 3/1990 |
| JP | 02-239566 | | 9/1990 |
| JP | 05-343058 | | 12/1993 |
| JP | 07-099052 | | 4/1995 |
| JP | 09-102314 | | 4/1997 |
| JP | 10-040908 | | 2/1998 |
| JP | 10-040918 | | 2/1998 |
| JP | 10-275631 | | 10/1998 |
| JP | 11-031504 | | 2/1999 |
| JP | 11-288725 | | 10/1999 |
| JP | 11-288726 | | 10/1999 |
| JP | 11-339814 | | 12/1999 |
| JP | 2000-030713 | | 1/2000 |
| JP | 2000-040516 | * | 2/2000 |
| JP | 2000-100435 | | 4/2000 |
| JP | 2002-042902 | | 2/2002 |
| JP | 2002-117858 | * | 4/2002 |
| JP | 2003-031215 | | 1/2003 |
| JP | 2004-047290 | | 2/2004 |
| JP | 2004-269929 | | 9/2004 |
| JP | 2005-108646 | | 4/2005 |
| JP | 2006-236915 | | 9/2006 |
| JP | 2007-265631 | | 10/2007 |
| JP | 2007-294418 | | 11/2007 |
| JP | 2008-153097 | | 7/2008 |
| JP | 2008-192320 | | 8/2008 |
| JP | 2009-295575 | | 12/2009 |
| JP | 2011-014258 | | 1/2011 |
| WO | 8404208 A1 | | 10/1984 |

OTHER PUBLICATIONS

English translation of JP Publication 2000-040516, Feb. 2000.*
International Search Report dated Sep. 11, 2012 filed in PCT/JP2012/069240.
Extended European Search Report dated Nov. 10, 2014 issued in European patent application No. 12817223.6.

* cited by examiner

NEGATIVE ELECTRODE FOR ALKALINE SECONDARY BATTERY, OUTER CASE FOR ALKALINE SECONDARY BATTERY AND ALKALINE SECONDARY BATTERY

TECHNICAL FIELD

The present invention relates to a negative electrode for an alkaline secondary battery, an outer case for an alkaline secondary battery, and an alkaline secondary battery. More particularly, the present invention relates to a negative electrode for an alkaline secondary battery which suppresses elution of iron into an electrolyte solution even in an environment in which the elution of iron, being a negative electrode substrate, into an electrolyte solution tends to occur, an outer case for an alkaline secondary battery, and an alkaline secondary battery.

BACKGROUND ART

In recent years, there has been a trend for motorized equipment requiring a large current discharge, including hybrid-type electric vehicles and electric power tools, to rapidly expand. As a power source of these equipment, alkaline secondary batteries such as nickel-metal hydride batteries and nickel-cadmium batteries are widely used. In the market, particularly, an inexpensive alkaline secondary battery having a high capacity is desired, and cost reduction of the alkaline secondary battery is also desired intensely.

Therefore, use of an iron substrate as an electrode in place of a substrate made of expensive pure nickel used as a negative electrode is proposed in order to reduce the material cost of an alkaline secondary battery. However, iron is easily dissolved in an electrolyte solution. Further, it is known that the dissolved iron is deposited at a positive electrode potential to cause deterioration of charge efficiency. Since the amount of elution of iron increases with time, a longer storage period after production of a battery more frequently causes lowering of the battery capacity.

Therefore, an iron substrate having a conductive protecting layer formed on the surface thereof is usually used. However, even if the conductive protecting layer is formed on the surface of the iron substrate, the elution of iron may not be adequately suppressed in the case of a thin protecting layer when defects are present on the conductive protecting layer. Therefore, usually, in the iron substrate having a conductive protecting layer formed thereon, the thickness of the conductive protecting layer is set to more than 3 µm. For example, in Patent Document 1, the thickness of the conductive protecting layer is set to 4 µm or more. In Patent Document 1, thick nickel plating is employed as a conductive protecting layer to be used in the positive electrode in order to suppress iron contamination in the positive electrode.

Also, iron is used as a substrate for an outer case as with the negative electrode. Therefore, iron is dissolved and deposited at a positive electrode potential as with the negative electrode to cause deterioration of charge efficiency. Therefore, usually, a conductive protecting layer having a thickness smaller than that of the negative electrode but larger than 0.5 µm is formed in order to suppress the elution of iron also for the outer case.

When the thickness of the conductive protecting layer is increased in the negative electrode or the outer case in this way, it is possible to suppress the elution of iron, but the cost increases as the thickness increases. Therefore, the advantage of use of the iron substrate as an alternative to an expensive nickel substrate is not adequately utilized. Accordingly, increase in the thickness of the conductive protecting layer is not practical.

In view of the above-mentioned situation, there is a desire for a negative electrode, which can suppress the elution of iron and can suppress the lowering of charge efficiency even under conditions in which the elution of iron into an electrolyte solution tends to occur, including a case where the thickness of a conductive protecting layer is small or where the conductive protecting layer has defects, or under conditions in which the surface of the iron substrate is exposed.

PRIOR ART DOCUMENT

Patent Document

Patent Document 1: JP-A-2007-265631

SUMMARY OF THE INVENTION

Problems to be Solved by the Invention

It is an object of the present invention to provide a negative electrode for an alkaline secondary battery, which can suppress elution of iron to improve the long-period storage property of the battery capacity even under conditions in which elution of iron in a substrate into an electrolyte solution tends to occur, and which can also suppress lowering of initial capacity and increase in internal resistance.

Means for Solving the Problems

The present inventors made various earnest investigations in view of the above-mentioned problems. As a result, they found that even under conditions in which the elution of iron in the substrate into an electrolyte solution tends to occur, including a case where there is no conductive protecting layer, where there is a thin conductive protecting layer at the surface or where the conductive protecting layer has defects, by adding magnesium or a magnesium compound to the negative electrode for an alkaline secondary battery (excluding the case where magnesium is contained as a constituent element of a hydrogen storage alloy), the elution of iron can be suppressed. Thereby, the long-period storage property of the battery capacity can be improved and lowering of the initial capacity can be avoided. When magnesium or a magnesium compound is contained in a positive electrode for an alkaline secondary battery, the improvement in the long-period storage property of the battery capacity was not found. This effect is more remarkable in the case where a magnesium compound layer is formed on the current collecting substrate. The present invention was completed by further making investigations based on such findings.

That is, the present invention includes the following negative electrode for an alkaline secondary battery, an outer case for an alkaline secondary battery, and alkaline secondary battery.

(1) A negative electrode for an alkaline secondary battery including a current collecting substrate having a substrate containing iron, wherein the current collecting substrate does not have a conductive protecting layer, or has a conductive protecting layer having a thickness of 3 µm or less or having defects, on the substrate, and wherein the negative electrode contains magnesium or a magnesium compound and a hydrogen storage alloy.

(2) The negative electrode for an alkaline secondary battery according to (1), wherein the protecting layer includes nickel.

(3) The negative electrode for an alkaline secondary battery according to (1) or (2), wherein the protecting layer is a plating film.

(4) The negative electrode for an alkaline secondary battery according to any one of (1) to (3), wherein a hydrogen storage alloy layer is further formed on the current collecting substrate.

(5) The negative electrode for an alkaline secondary battery according to any one of (1) to (4), wherein the hydrogen storage alloy layer contains magnesium or a magnesium compound and a hydrogen storage alloy.

(6) The negative electrode for an alkaline secondary battery according to any one of (1) to (5), wherein a magnesium compound layer is formed on the current collecting substrate.

(7) The negative electrode for an alkaline secondary battery according to any one of (1) to (6), wherein a magnesium compound layer and a hydrogen storage alloy layer are formed on the current collecting substrate.

(8) The negative electrode for an alkaline secondary battery according to (6) or (7), wherein the magnesium compound layer is formed directly on the current collecting substrate.

(9) The negative electrode for an alkaline secondary battery according to any one of (1) to (8), wherein the content of magnesium or the magnesium compound is 0.1 to 3.0% by mass with respect to the total amount of the hydrogen storage alloy and magnesium or the magnesium compound in the negative electrode.

(10). The negative electrode for an alkaline secondary battery according to any one of (1) to (9), wherein a magnesium layer is formed on the current collecting substrate when the negative electrode is observed by using an electron probe microanalyzer.

(11) The negative electrode for an alkaline secondary battery according to any one of (1) to (10), wherein the magnesium compound is magnesium oxide.

(12) The negative electrode for an alkaline secondary battery according to any one of (6) to (11), wherein the magnesium compound layer is formed by impregnating the current collecting substrate with a paste containing a compound including magnesium or by coating a paste containing a compound including magnesium onto the current collecting substrate.

(13) An alkaline secondary battery including the negative electrode for an alkaline secondary battery according to any one of (1) to (12).

(14) An alkaline secondary battery having a negative electrode for an alkaline secondary battery including a current collecting substrate having a substrate containing iron, and a separator, wherein a magnesium compound layer is formed on a separator surface opposed to the negative electrode.

Advantages of the Invention

In accordance with the present invention, it is possible to provide a negative electrode for an alkaline secondary battery and an outer case for an alkaline secondary battery which can suppress the elution of iron to improve the long-period storage property of the battery capacity and can also suppress the lowering of the initial capacity by adding magnesium or a magnesium compound to the negative electrode for an alkaline secondary battery (excluding the case where magnesium is contained as a constituent element of a hydrogen storage alloy), even under conditions in which the elution of iron in the substrate into an electrolyte solution tends to occur, including a case where there is a thin conductive protecting layer at the surface. Incidentally, also when the magnesium compound layer is formed on the separator surface opposed to the negative electrode, a similar effect is achieved.

MODE FOR CARRYING OUT THE INVENTION

Figure 1:
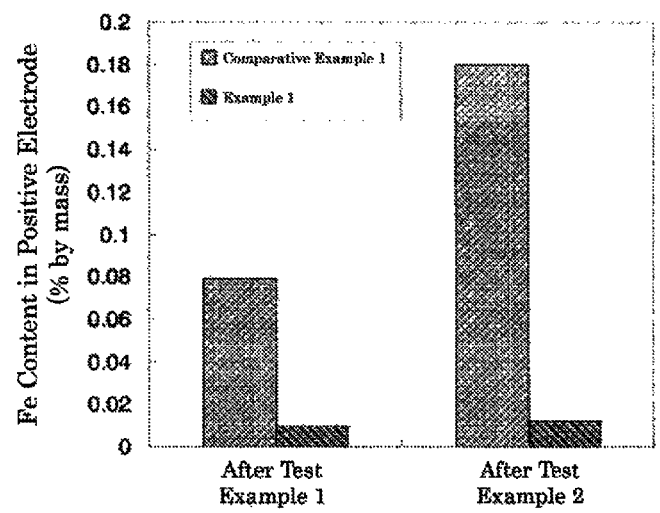
FIG. 1 is a graph showing the results of Test Example 3 on Example 1 and Comparative Example 1.

1. Negative Electrode for Alkaline Secondary Battery

The negative electrode for an alkaline secondary battery of the present invention contains magnesium or a magnesium compound in the negative electrode for an alkaline secondary battery (excluding the case where magnesium is contained as a constituent element of a hydrogen storage alloy) under conditions in which the elution of iron in the substrate containing iron into an electrolyte solution tends to occur. Incidentally, in the present invention, the term magnesium compound is a concept excluding a magnesium alloy. Specifically, the negative electrode has the following constitution.

(1) a constitution which includes a current collecting substrate having a substrate containing iron and a conductive protecting layer having a thickness of 3 μm or less on the substrate, and contains a magnesium compound.

(2) a constitution which includes a current collecting substrate having a substrate containing iron and a conductive protecting layer having a thickness of 3 μm or less on the substrate, and contains magnesium or a magnesium compound and a hydrogen storage alloy.

(3) a constitution including a current collecting substrate having a substrate containing iron, which may have a conductive protecting layer having a thickness of 3 µm or less on the substrate surface, and containing a magnesium compound.

(4) a constitution including a current collecting substrate having a substrate containing iron, which may have a conductive protecting layer having a thickness of 3 µm or less on the substrate surface, and containing magnesium or a magnesium compound and a hydrogen storage alloy.

(5) A negative electrode for an alkaline secondary battery including a current collecting substrate having a substrate containing iron and a conductive protecting layer on the substrate, wherein the negative electrode contains a magnesium compound and a hydrogen storage alloy, and the protecting layer has defects.

The substrate containing iron may be a substrate containing iron as a main component, or may be a substrate consisted of iron. For the substrate containing iron, any substrate can be employed without limitation as long as it is a substrate containing iron, which has been conventionally used in the alkaline secondary battery.

Further, a conductive protecting layer may be formed on the substrate containing iron. In order to more effectively suppress the elution of iron being a substrate, it is preferred that the protecting layer is formed. However, from the viewpoint of cost, it is preferred that the thickness of the protecting layer is small or the protecting layer is not formed.

A method of forming the conductive protecting layer is not particularly limited, and for example, a plating method, a vapor deposition method, and a method of bonding a layer of intended metal to a substrate to form a clad, and the like can be employed. That is, as the conductive protecting layer, a plating film, a vapor-deposited film, a clad film and the like can be employed. Particularly, the plating film formed by the plating method is preferred from the viewpoint of cost and that it is capable of homogeneously forming a layer on a substrate.

A method which is employed for forming the conductive protecting layer by use of a plating method is not particularly limited, and electrolytic plating, non-electrolytic plating and the like, which are conventionally publicly known, can be employed. Also, commercially available plated iron substrates (nickel-plated iron substrate, etc.) can be employed.

An element for constituting the conductive protecting layer is not particularly limited as long as it is an element which can suppress the elution of iron and can form a conductive protecting layer. Examples of the element include nickel, copper, gold, and platinum. Among these elements, a material that does not dissolve in the electrolyte solution when exposed to the potential of the negative electrode is preferred. A metal is preferred in that it has excellent conductivity, and particularly, nickel and copper are preferred, and nickel is more preferred.

Incidentally, the conductive protecting layer does not always have to be consisted of the above-mentioned constituent element, and can contain, for example, magnesium or a magnesium compound. For example, when the conductive protecting layer contains magnesium or a magnesium compound, since magnesium or the magnesium compound protects iron being a substrate, it is possible to suppress the elution of iron in the negative electrode to improve the long-period storage property of the battery capacity and to suppress the lowering of the initial capacity as with the case where a layer made of magnesium or a magnesium compound is formed on a current collecting substrate, namely, on a conductive protecting layer, as described later. As described above, a method of adding magnesium or a magnesium compound to the conductive protecting layer is not particularly limited. For example, when a plating film is employed as the conductive protecting layer, one method may be appropriately selected from among an electrolytic plating process, a non-electrolytic plating process and the like, which are conventionally publicly known.

In conventional alkaline secondary batteries, the thickness of the conductive protecting layer is set to more than 3 µm as a configuration which is essential for suppressing the elution of iron. When the conductive protecting layer has a larger thickness, the iron substrate can be more adequately protected and therefore the long-period stability of the battery capacity can be improved. However, the increase in the thickness of the conductive protecting layer is not practical because it leads to high cost in the case of employing a nickel plating film as the conductive protecting layer. Therefore, in the present invention, the thickness of the conductive protecting layer is preferably 3 µm or less, and more preferably 1 µm or less. Incidentally, the lower limit of the thickness in the case of forming the conductive protecting layer is not particularly limited, and the lower limit is usually about 100 nm though there can be an embodiment in which the conductive protecting layer is not formed. The thickness of the conductive protecting layer can be measured by a method of shaving out a cross-section of the substrate, for example, by irradiating the substrate with FIB (focused ion beam) and observing the cross-section of the substrate with an electron microscope such as a SEM.

However, when the conductive protecting layer is not disposed, or when the thickness of the conductive protecting layer is small, the iron substrate cannot be adequately protected, and therefore iron being the substrate tends to be eluted into an electrolyte solution. Further, even in the case of disposing the conductive protecting layer, when the conductive protecting layer has defects or the iron substrate is partially exposed, the iron substrate cannot be adequately protected, and therefore iron being the substrate tends to be eluted into an electrolyte solution. Incidentally, with respect to judgment whether there are defects in the conductive protecting layer or not, for example, it is possible to determine that there are defects in the conductive protecting layer based on the ferroxyle test described in Japanese Industrial Standards JIS H 8617. That is, if the number of mottles per 10 $cm^2$ is 1 or more taking a mottle with a diameter less than 1 mm as a number of mottles of 1, a mottle with a diameter of 1 mm or more and less than 3 mm as a number of mottles of 3, and a mottle with a diameter of 3 mm or more and less than 5 mm as a number of mottles of 10, the conductive protecting layer is judged to have defects.

In this way, the conductive protecting layer can be formed on the substrate containing iron as required, and thereby, the substrate provided with the conductive protecting layer can be used as a current collecting substrate.

In the present invention, as described above, even when the elution of iron into the electrolyte solution tends to occur, the elution of iron can be suppressed efficiently by adding magnesium or a magnesium compound of a morphology other than the constituent element of a hydrogen storage alloy to the negative electrode. Particularly, it is preferred that a thin magnesium layer is formed on the surface of the negative electrode by adding magnesium or a magnesium compound of a morphology other than the constituent element of a hydrogen storage alloy to the negative electrode. As described above, the formation of the thin magnesium layer can be observed by using, for example, an electron probe microanalyzer. Incidentally, certain levels of high capacity and long-period storage property of the battery capacity can be anticipated also when antimony or an antimony compound, niobium or a niobium compound, or the like is contained in place of magnesium or a magnesium compound in the negative electrode. However, the initial capacity is slightly lowered in the case of the antimony compound, and the long-period storage property of the battery capacity is lower than that of the magnesium compound in the case of the niobium compound.

A method of adding magnesium or a magnesium compound to the negative electrode for an alkaline secondary battery of the present invention is not particularly limited. For example, it is possible to add magnesium or a magnesium compound and a hydrogen storage alloy to a hydrogen storage alloy layer usually formed on a substrate containing iron.

A material of the hydrogen storage alloy is not particularly limited, and a material conventionally used as a negative active material for an alkaline secondary battery can be used. For example, the hydrogen storage alloy may be an alloy which can store hydrogen and is generally called as an $AB_2$ type alloy, an $AB_5$ type alloy, or a mixed alloy of $AB_2$ and $AB_5$, and there is no particular limitation on the composition of the alloy. Among these alloys, an alloy, which is formed by substituting Co, Mn, Al, Cu or the like for a part of Ni of $MmNi_5$ (Mm is a mixture of rare earth elements (misch metal)) which is an $AB_5$ type alloy, is preferred since it has excellent charge-discharge cycle life performance and a high discharge capacity.

When a magnesium component is added to the negative electrode separately from the hydrogen storage alloy, the morphology of the magnesium to be charged may be a magnesium metal or a magnesium compound. Specific examples of the magnesium compound include magnesium oxide, magnesium hydroxide and the like. Magnesium oxide is more preferred because it makes the content ratio of magnesium in the compound higher and makes dissolution/deposition of magnesium occur more easily.

In this case, from the viewpoint of suppressing the elution of iron without lowering the conductivity of the negative electrode and without increasing the internal resistance, the content of magnesium or a magnesium compound is preferably about 0.1 to 3.0% by mass, and more preferably about 0.3 to 1.0% by mass with respect to the total amount of the hydrogen storage alloy and magnesium or the magnesium compound in the negative electrode.

In addition to the above-mentioned components, other components such as a binder, a thickener, a conductive agent and the like can be added to the hydrogen storage alloy layer.

Examples of the binder include thermoplastic resins such as polytetrafluoroethylene (PTFE), polyvinylidene fluoride, polyethylene and polypropylene; and polymers having rubber elasticity such as ethylene-propylene-diene terpolymer (EPDM), sulfonated EPDM, styrene-butadiene rubber (SBR) and fluorine-containing rubber, and in general, these compounds may be used singly or as a mixture of two or more thereof. The amount of the binder added is preferably about 0.1 to 1.0% by mass with respect to the total mass of the negative electrode.

Examples of the thickener include polysaccharides such as carboxymethyl cellulose and methylcellulose, and in general, these compounds may be used singly or as a mixture of two or more thereof. The amount of the thickener added is preferably about 0.1 to 2.0% by mass with respect to the total mass of the negative electrode.

The conductive agent is not limited as long as it is an electron-conductive material which does not adversely affect the battery performance. Examples of the conductive agent include natural graphites such as scaly graphite, flake graphite and amorphous graphite; synthetic graphite; carbon black; acetylene black; Ketjen black; carbon whisker; carbon fiber; vapor-grown carbon; metallic (nickel, etc.) powders; and metallic fibers, and in general, these compounds may be included singly, or may be included as a mixture of two or more thereof.

The amount of the conductive agent added is preferably about 0.5 to 3.0% by mass with respect to the total mass of the negative electrode.

As a method of mixing these compounds, physical mixing is used, and these compounds are ideally uniformly mixed. Therefore, it is possible to use a powder mixer such as a V type mixer, an S type mixer, a stone mill, a ball mill or a planetary ball mill in a wet manner or a dry manner. When magnesium is added, it is possible to mix a hydrogen storage alloy with a magnesium component (magnesium oxide, etc.) first, and then uniformly mixing the resulting mixture with other components.

Next, a method which is employed for the case of adding magnesium or a magnesium compound and a hydrogen storage alloy to the hydrogen storage alloy layer in the negative electrode for an alkaline secondary battery of the present invention will be described briefly.

Examples of the method include a method in which various components such as a hydrogen storage alloy and a magnesium component are mixed in water to prepare a paste composition for forming a hydrogen storage alloy layer, and then the substrate containing iron, on which the conductive protecting layer is formed or is not formed, is impregnated with the paste composition for forming a hydrogen storage alloy layer, or the paste composition is applied onto the substrate containing iron, and the paste composition is dried.

With respect to a method of coating the paste, the paste is preferably applied so as to have an arbitrary thickness and an arbitrary shape by using a means such as roller coating by an applicator roll or the like; screen coating; doctor blade scheme; spin coating; and bar coating, but the method of coating the paste is not limited to these methods.

In the negative electrode for an alkaline secondary battery of the present invention, a magnesium compound layer may be further formed in a positive manner on a current collecting substrate having a substrate containing iron and an optional conductive protecting layer formed thereon.

In the present invention, as described above, the elution of iron being a substrate can be suppressed by adding magnesium or a magnesium compound to the negative electrode, and as an embodiment of adding magnesium or a magnesium compound to the negative electrode, it is also possible to further form a magnesium compound layer in a positive manner on the current collecting substrate. Particularly, even when the elution of iron into the electrolyte solution tends to occur, the elution of iron can be suppressed efficiently. Incidentally, in the present invention, the magnesium compound layer is different from the above-mentioned hydrogen storage alloy layer.

The reason for using the magnesium compound is that the diffusion of the magnesium compound into the alkaline electrolyte solution hardly occurs and the internal resistance does not increase even when dissolving the magnesium compound in the electrolyte solution since the saturated solubility of the magnesium compound in an alkaline electrolyte solution is low. Also when an antimony compound layer or the like is formed, although certain levels of high capacity and long-period storage property of the battery capacity can be anticipated, the internal resistance tends to increase.

When the magnesium compound layer is formed, examples of the magnesium compound include magnesium oxide, magnesium hydroxide and the like, and magnesium oxide is more preferred because it makes the content ratio of magnesium in the compound higher and makes dissolution/deposition of magnesium occur more easily.

The magnesium compound layer may be a layer made only of the above-mentioned magnesium compound, or may be a layer containing other components. However, the content of the magnesium compound is preferably adjusted so as to be 1 to 55 g. particularly 2 to 20 g, per square meter of substrate area from the viewpoint of suppressing the elution of iron and not impairing the conductivity and binding property between the magnesium compound layer and the above-mentioned hydrogen storage alloy layer.

When the magnesium compound layer contains components other than the magnesium compound, the magnesium compound layer may contain a binder, a thickener, a conductive agent and the like.

Examples of the binder include thermoplastic resins such as polytetrafluoroethylene (PTFE), polyvinylidene fluoride, polyethylene and polypropylene; and polymers having rubber elasticity such as ethylene-propylene-diene terpolymer (EPDM), sulfonated EPDM, styrene-butadiene rubber (SBR) and fluorine-containing rubber, and in general, these compounds may be used singly or as a mixture of two or more thereof. The amount of the binder added is preferably about 0.1 to 1.0% by mass with respect to the total mass of the negative electrode in terms of the sum of the binder and other components contained in the above-mentioned hydrogen storage alloy layer.

Examples of the thickener include polysaccharides such as carboxymethyl cellulose and methylcellulose, and in general, these compounds may be used singly or as a mixture of two or more thereof. The amount of the thickener added is preferably about 0.1 to 2.0% by mass with respect to the total mass of the negative electrode in terms of the sum of the thickener and other components contained in the above-mentioned hydrogen storage alloy layer.

The conductive agent is not limited as long as it is an electron-conductive material which does not adversely affect the battery performance. Examples of the conductive agent include natural graphites such as scaly graphite, flake graphite and amorphous graphite; synthetic graphite; carbon black; acetylene black; Ketjen black; carbon whisker; carbon fiber; vapor-grown carbon; metallic (nickel, etc.) powders; and metallic fibers, and in general, these compounds may be included singly, or may be included as a mixture of two or more thereof. The amount of the conductive agent added is preferably about 0.5 to 3.0% by mass with respect to the total mass of the negative electrode in terms of the sum of the conductive agent and other components contained in the above-mentioned hydrogen storage alloy layer.

As a method of mixing these compounds, physical mixing is used, and these compounds are ideally uniformly mixed. Therefore, it is possible to use a powder mixer such as a V type mixer, an S type mixer, a stone mill, a ball mill or a planetary ball mill in a wet manner or a dry manner.

The magnesium compound layer can be formed by using, for example, a paste containing a magnesium compound. This paste contains at least the magnesium compound described above, and may contain the binder, thickener, conductive agent and the like described above in the amount described above in accordance with the intended magnesium compound layer.

Since the magnesium compound layer itself is dissolved/deposited at a negative electrode potential, it has the effect of homogenization (formation of the protecting layer) during storage also when there are defects in the conductive protecting layer or the magnesium compound layer itself has defects. In this point, the magnesium compound layer can suppress the elution of iron more remarkably than a conductive protecting layer such as plating, which is a layer formed in advance on a substrate containing iron. For example, even when breakage of the conductive protecting layer occurs due to a cutting step or a pressing step at the time of production, a magnesium compound can self-repair the broken layer through dissolution/deposition after being incorporated into a battery.

In the negative electrode for an alkaline secondary battery of the present invention, it is preferred to have the above-mentioned magnesium compound layer on the substrate containing iron. As described above, by positively disposing the magnesium compound layer separately, lowering of the initial discharge capacity due to the inclusion of the magnesium compound can be more effectively suppressed than in the case where the magnesium compound is mixed in the hydrogen storage alloy layer. Also, compared with the case of not including the magnesium compound in the negative electrode, the long-period storage property of the discharge capacity can be improved.

Incidentally, the magnesium compound layer may be formed directly on the substrate containing iron, which has a conductive protecting layer as required, that is, on the current collecting substrate, or may be formed with the hydrogen storage alloy layer interposed between the current collecting substrate and the magnesium compound layer. Particularly, it is preferred that the magnesium compound layer is formed directly on the current collecting substrate, and the hydrogen storage alloy layer is further formed thereon in that the elution of iron can be more suppressed.

Incidentally, as the hydrogen storage alloy layer, the above-mentioned hydrogen storage alloy layer can be employed.

Next, in the negative electrode for an alkaline secondary battery of the present invention, a method of forming the magnesium compound layer will be described briefly.

When the magnesium compound layer is formed directly on the current collecting substrate, a magnesium compound layer can be formed on a current collecting substrate by first mixing various components such as a magnesium compound in water to prepare a paste for forming a magnesium compound layer, and then impregnating the current collecting substrate with the paste for forming a magnesium compound layer or coating the paste onto the current collecting substrate, and drying the paste as required. When the hydrogen storage alloy layer is also formed, next, in the same way, various components such as a hydrogen storage alloy are mixed in water to prepare a paste for forming a hydrogen storage alloy layer, and then the current collecting substrate is impregnated with the paste for forming a hydrogen storage alloy layer or the paste is applied onto the formed magnesium compound layer, and the paste is dried as required, and thereby, a hydrogen storage alloy layer can be formed and the negative electrode for an alkaline secondary battery of the present invention can be produced.

On the other hand, when the magnesium compound layer is formed with the hydrogen storage alloy layer interposed between the magnesium compound layer and the current collecting substrate, it is only necessary to reverse the order of formation of the hydrogen storage alloy layer and formation of the magnesium compound layer in the above-mentioned method. Specifically, a hydrogen storage alloy layer can be formed on a current collecting substrate by first mixing various components such as a hydrogen storage alloy in water to prepare a paste for forming a hydrogen storage alloy layer, and then impregnating the current collecting substrate with the paste for forming a hydrogen storage alloy layer or coating the paste onto the current collecting substrate, and drying the paste as required. Next, in the same way, various components such as a magnesium compound are mixed in water to prepare a paste for forming a magnesium compound layer, and then the current collecting substrate is impregnated with the paste for forming a magnesium compound layer or the paste is applied onto the formed hydrogen storage alloy layer, and the paste is dried as required, and thereby, a magnesium compound layer can be formed and the negative electrode for an alkaline secondary battery of the present invention can be produced.

An impregnation method and a coating method are not limited in both of the case of forming the magnesium compound layer and the case of forming the hydrogen storage alloy layer. For example, in both cases, the paste is preferably applied so as to have an arbitrary thickness and an arbitrary shape by using a means such as roller coating by an applicator roll or the like; screen coating; doctor blade scheme; spin coating; and bar coating, but the method of coating the paste is not limited to these methods.

2. Positive Electrode for Alkaline Secondary Battery

The positive electrode used in the present invention is not particularly limited, and a nickel electrode, which is conventionally used, can be used as the positive electrode. For example, a positive electrode described in WO 2006/064979 A or the like can be employed.

3. Separator

In the present invention, as a separator used in the alkaline secondary battery, porous films and non-woven fabrics, which are known and exhibit excellent high rate discharge characteristics, may be used singly or in combination. Examples of a material constituting the separator include polyolefin-based resins typified by polyethylene or polypropylene; nylon; and the like.

The porosity of the separator is preferably 80 vol. % or less with respect to the volume of the separator from the viewpoint of strength and gas permeability, and preferably 20 vol. % or more from the viewpoint of charge-discharge characteristics.

The separator is preferably subjected to a hydrophilization treatment. For example, the separator may be subjected to a graft polymerization treatment of hydrophilic groups, a sulfonation treatment, a corona treatment or a PVA treatment to the surface of a fiber of a polyolefin-based resin such as polyethylene. A sheet formed by mixing fibers previously subjected to these treatments may be used.

In the present invention, a magnesium compound layer may be formed on the separator surface opposed to the negative electrode. In this case, since the magnesium compound layer is formed on a path from the current collecting substrate to the positive electrode and the magnesium compound layer formed on the separator has almost the same potential as that of the negative electrode, it is possible to suppress the elution of iron in the negative electrode to improve the long-period storage property of the battery capacity and to suppress the lowering of the initial capacity, as with the case where a magnesium compound layer is formed on a current collecting substrate constituting the negative electrode.

Incidentally, when the magnesium compound layer is formed on the separator surface opposed to the negative electrode, the magnesium compound layer to be formed may be similar to that formed on the negative electrode described above. A method of forming the magnesium compound layer is also similar to the above-mentioned method.

4. Electrolyte Solution

In the present invention, an electrolyte solution, use of which in an alkaline secondary battery is commonly suggested, can be used for the electrolyte solution to be applied to the alkaline secondary battery. Examples of the electrolyte solution include electrolyte solutions which contain water as a solvent and which is formed by dissolving therein potassium hydroxide, sodium hydroxide or lithium hydroxide as an electrolyte singly or as a mixture of two or more thereof, but the electrolyte solution is not limited to these.

Various compounds, such as yttrium, ytterbium, erbium, calcium, sulfur and zinc, may be added singly or as a mixture of two or more thereof to the electrolyte solution as an anticorrosive for an alloy, or as an additive for improving the overvoltage at a positive electrode or for increasing corrosion resistance or self-discharge resistance at a negative electrode.

The electrolyte solution used in the present invention is preferably poured after housing a wound element in a container. As a method of pouring the electrolyte solution, a method of pouring the electrolyte solution at normal pressure can be employed, and a vacuum impregnation method, a pressure impregnation method or a centrifugal impregnation method can also be employed.

5. Outer Case

In the present invention, a material of the outer case (battery case) of the alkaline secondary battery is not particularly limited. Examples thereof include an iron substrate having a conductive protecting layer formed as required, stainless steel, polyolefin resins and complexes thereof.

In the present invention, the substrate containing iron, having a conductive protecting layer formed thereon as required, is used as a substrate constituting the outer case, and a magnesium compound layer may be formed thereon.

When the magnesium compound layer is not formed, since the outer case is usually in contact with the negative electrode and has almost the same potential as the negative electrode, iron in the substrate containing iron can be eluted into an electrolyte solution. In the present invention, since the a magnesium compound layer is formed on the case and the magnesium compound protects the substrate containing iron, it is possible to suppress the elution of iron in the outer case to improve the long-period storage property of the battery capacity and to suppress the lowering of the initial capacity, as with the case where a magnesium compound layer is formed on a substrate containing iron that forms the negative electrode. However, since the outer case is usually in contact with the negative electrode, and iron, even if eluted from the outer case, hardly reaches the positive electrode due to the negative electrode serving as a barrier, deterioration of the long-period storage property of the battery capacity and the initial capacity due to the elution of iron in the outer case is not as significant as the case of iron in the negative electrode. Accordingly, the case where the magnesium compound layer is formed on a substrate containing iron that forms the negative electrode can be expected to be more effective for improving the long-period storage property of the battery capacity and suppressing the lowering of the initial capacity than the above-mentioned case.

Incidentally, when the substrate containing iron, having a conductive protecting layer formed thereon as required, is used as a substrate constituting the outer case and the magnesium compound layer is formed thereon, the magnesium compound layer to be formed may be similar to that formed on the negative electrode described above. A method of forming the magnesium compound layer is also similar to the above-mentioned method.

6. Alkaline Secondary Battery

The alkaline secondary battery of the present invention includes an element formed by winding the above-mentioned negative electrode for an alkaline secondary battery and the above-mentioned positive electrode for an alkaline secondary battery with a separator interposed therebetween, and the element is housed in the outer case.

EXAMPLES

Hereinafter, the present invention will be described in more detail by way of examples and comparative examples. Incidentally, the present invention is not limited to the following examples.

Example 1

(Synthesis of Nickel Hydroxide Particles)

Ammonium sulfate and an aqueous solution of sodium hydroxide were added to an aqueous solution obtained by dissolving nickel sulfate, zinc sulfate and cobalt sulfate in such a way that the mass ratio of hydroxides of the respective metals was as described later to produce an amine complex. An aqueous solution of sodium hydroxide was further added dropwise while stirring the reaction system vigorously. The reaction system was controlled so as to maintain a reaction bath temperature within a range of 45° C.±2° C. and a pH within a range of 12±0.2, and thereby spherical high-density particles predominantly composed of nickel hydroxide (hereinafter, also simply referred to as nickel hydroxide particles), whose average particle size was 10 μm and the mass ratio of Ni, Zn and Co was 91:4:5 in terms of metal, were obtained.

(Formation of Surface Layer, Heating Treatment Process)

Into 400 ml of an alkaline aqueous solution controlled so as to keep the pH within a range of 12±0.2 with NaOH, 100 g of the spherical high-density nickel hydroxide particles were added. An aqueous solution containing cobalt sulfate and ammonia which have predetermined concentrations was added dropwise while stirring the alkaline aqueous solution. During this time, an aqueous NaOH solution was appropriately added dropwise to maintain the reaction bath temperature within a range of 45° C.±2° C. and the pH within a range of 12±0.2. By maintaining the temperature within a range of 45° C.±2° C. and the pH within a range of 12±0.2 for about 1 hour, a surface layer made of mixed hydroxides containing Co was formed on the surface of nickel hydroxide particles. To the resulting particles, an 18 mol/l aqueous NaOH solution was added, and the resulting mixture was mixed to be brought into a wet state and held for 1 hour at 120° C. Then, the aqueous sodium hydroxide solution was separated by filtration, washed with water, and dried. The proportion of the surface layer of the resulting composite hydroxide particles was 7% by mass with respect to core layer mother particles (hereinafter, simply referred to as a core layer).

(Preparation of Nickel Electrode)

A 1% by mass aqueous solution of carboxymethylcellulose (CMC) was added to the resulting active material particles (composite hydroxide particles), and the resulting mixture was kneaded, and in this, polytetrafluoroethylene (PTFE) was mixed to form a positive electrode paste. The ratio between the active material and PTFE (solid content) in this time was set to 97:3. The positive electrode paste was filled into a nickel foam substrate having a thickness of 1.4 mm and an area density of 320 g/m², and dried. The resulting substrate was rolled to obtain an electrode sheet of a nickel electrode of 0.4 mm in thickness. The electrode sheet was cut into a size of 40 mm×60 mm. The active material was filled into the substrate so that the electrode capacity of the plate of this size was 500 mAh.

(Preparation of Hydrogen Storage Alloy Electrode)

First, a hydrogen storage alloy powder having an average particle size of 50 μm and the composition of $MmNi_{4.0}Co_{0.7}Al_{0.3}Mn_{0.3}$ (Mm indicates a misch metal) and an MgO powder were mixed. Then, to the resulting mixture, a dispersion liquid of SBR (styrene-butadiene rubber) serving as a binder and an aqueous methyl cellulose (MC) solution serving as a thickener were added, and the resulting mixture was kneaded to form a negative electrode paste. The proportion among the hydrogen storage alloy, MgO and SBR (solid content) was 99:1:1 (mass ratio). After the paste was applied onto a nickel-plated (thickness: 3 μm) substrate (thickness before plating: 45 μm) made of a holed steel sheet, the resulting substrate was dried and rolled to form an electrode sheet of a hydrogen storage alloy electrode, and the electrode sheet was cut into a size of 45 mm×65 mm to form a hydrogen storage alloy electrode. Incidentally, the filling capacity of the hydrogen storage alloy electrode (amount of hydrogen storage alloy electrode powder used for filling×capacity per unit weight of hydrogen storage alloy powder) was 1000 mAh.

(Preparation of Sealed Battery and Test Conditions Therefor)

The electrode sheet of a nickel electrode and the electrode sheet of a hydrogen storage alloy electrode were cut into predetermined dimensions, layered with a separator interposed therebetween, and the layered product was wound to constitute an element. The element (the amount of an active material filled per unit area was changed so as to attain a predetermined capacity) was inserted into a metallic container also serving as a negative electrode terminal. 2.4 g of an alkaline electrolyte solution containing 6.8 mol/L KOH and 0.8 mol/L LiOH was poured into the container. An open end of the metallic container was hermetically sealed by a cap also serving as a positive electrode terminal to form a cylindrical sealed nickel-metal hydride secondary battery. In the secondary battery, the filling capacity of the positive electrode (nickel electrode) was set to 2100 mAh, and the filling capacity of the negative electrode (hydrogen storage alloy electrode) was set to 2700 mAh. Thereafter, the secondary battery was subjected to predetermined formation, and then charge-discharge cycle was repeated three times under the following conditions. Charging was performed at a rate of 0.1 ItA with respect to the positive electrode for 16 hours. Discharging was performed at a rate of 0.2 ItA, and cut at the time point when the battery voltage reached 1.0 V.

Test Example 1: One-Month Storage Test [Test of Sealed Battery]

After the prepared sealed battery was stored at 45° C. for one month (in a state in which the sealed battery had been discharged), the charge-discharge cycle of the sealed battery was repeated three times under the same conditions as in the above-mentioned paragraph (Preparation of Sealed Battery and Test Conditions Therefor). In this case, the discharge capacity at the initial third cycle was defined as an initial capacity, and the discharge capacity at the third cycle after storage was defined as a post-storage capacity, and these capacities were compared with each other. Further, the ratio (%) of the post-storage capacity to the initial capacity was taken as the capacity retention ratio.

Test Example 2: Two-Month Storage Test [Test of Sealed Battery]

After the prepared sealed battery was stored at 45° C. for two months (in a state in which the sealed battery had been discharged), the charge-discharge cycle of the sealed battery was repeated three times under the same conditions as in the above-mentioned paragraph (Preparation of Sealed Battery and Test Conditions Therefor). In this case, the discharge capacity at the initial third cycle was defined as an initial capacity, and the discharge capacity at the third cycle after storage was defined as a post-storage capacity, and these capacities were compared with each other. Further, the ratio (%) of the post-storage capacity to the initial capacity was taken as the capacity retention ratio. Further, in Test Example 2, a sample for use was prepared separately from the sample used in Test Example 1.

Test Example 3: Content of Fe in Positive Electrode after Storage Test

In Test Examples 1 and 2, the sealed batteries after the storage test were disassembled, and the content of Fe in the positive electrode was measured by ICP measurement.

Test Example 4: Measurement by EPMA

After the prepared sealed battery was stored at 46° C. for one month (in a state in which the sealed battery had been discharged), the charge-discharge cycle of the sealed battery was repeated three times under the same conditions as in the above-mentioned paragraph (Preparation of Sealed Battery and Test Conditions Therefor). Thereafter, the negative electrode was taken out, the hydrogen storage alloy layer was scraped off the substrate, and the substrate was taken out. Distribution of the respective elements was investigated on this substrate by using an electron probe microanalyzer (EPMA).

Comparative Example 1: Blank

A sealed battery of Comparative Example 1 was prepared in the same manner as in Example 1 (the ratio between the hydrogen storage alloy and SBR (solid content) was 100:1 (mass ratio)) except that MgO was not used in preparing the hydrogen storage alloy electrode.

Comparative Example 2: $MoO_3$

A sealed battery of Comparative Example 2 was prepared in the same manner as in Example 1 except that $MoO_3$ was used in place of MgO in preparing the hydrogen storage alloy electrode.

Comparative Example 3: $Bi_2O_3$

A sealed battery of Comparative Example 3 was prepared in the same manner as in Example 1 except that $Bi_2O_3$ was used in place of MgO in preparing the hydrogen storage alloy electrode.

Comparative Example 4: $Sb_2O_3$

A sealed battery of Comparative Example 4 was prepared in the same manner as in Example 1 except that $Sb_2O_3$ was used in place of MgO in preparing the hydrogen storage alloy electrode.

Comparative Example 5: $Y_2O_3$

A sealed battery of Comparative Example 5 was prepared in the same manner as in Example 1 except that $Y_2O_3$ was used in place of MgO in preparing the hydrogen storage alloy electrode.

Comparative Example 6: $Nb_2O_5$

A sealed battery of Comparative Example 6 was prepared in the same manner as in Example 1 except that $Nb_2O_5$ was used in place of MgO in preparing the hydrogen storage alloy electrode.

Comparative Example 7: $ZrO_2$

A sealed battery of Comparative Example 7 was prepared in the same manner as in Example 1 except that $ZrO_2$ was used in place of MgO in preparing the hydrogen storage alloy electrode.

Comparative Example 8: $TiO_2$

A sealed battery of Comparative Example 8 was prepared in the same manner as in Example 1 except that $TiO_2$ was used in place of MgO in preparing the hydrogen storage alloy electrode.

Comparative Example 9: $WO_3$

A sealed battery of Comparative Example 9 was prepared in the same manner as in Example 1 except that $WO_3$ was used in place of MgO in preparing the hydrogen storage alloy electrode.

Comparative Example 10: $V_2O_5$

A sealed battery of Comparative Example 10 was prepared in the same manner as in Example 1 except that $V_2O_5$ was used in place of MgO in preparing the hydrogen storage alloy electrode.

Comparative Example 11: $SnO_2$

A sealed battery of Comparative Example 11 was prepared in the same manner as in Example 1 except that $SnO_2$ was used in place of MgO in preparing the hydrogen storage alloy electrode.

Comparative Example 12: Fe

A sealed battery of Comparative Example 12 was prepared in the same manner as in Example 1 except that Fe was used in place of MgO in preparing the hydrogen storage alloy electrode.

As to Example 1 and Comparative Examples 1 to 12, the results of the initial capacity, the post-storage capacity and the capacity retention ratio of Test Example 1 are shown in Table 1, and the results of the initial capacity, the post-storage capacity and the capacity retention ratio of Test Example 2 are shown in Table 2. Incidentally, as to Comparative Example 11, in both cases of Test Examples 1 and 2, the capacities were extremely decreased at an early stage, and therefore the tests were aborted.

TABLE 1

One-Month Storage Test (Test of Sealed Battery)

| | Additive | Initial Capacity (mAh) | Post-storage Capacity (mAh) | Capacity Retention Ratio (%) |
|---|---|---|---|---|
| Example 1 | MgO | 2025 | 1998 | 98.6 |
| Comparative Example 1 | Blank | 2049 | 1952 | 95.3 |
| Comparative Example 2 | $MoO_3$ | 2042 | 1947 | 95.3 |
| Comparative Example 3 | $Bi_2O_3$ | 2065 | 1922 | 93.1 |
| Comparative Example 4 | $Sb_2O_3$ | 1984 | 1924 | 97.0 |
| Comparative Example 5 | $Y_2O_3$ | 2063 | 1935 | 93.8 |
| Comparative Example 6 | $Nb_2O_5$ | 2057 | 1964 | 95.5 |
| Comparative Example 7 | $ZrO_3$ | 2063 | 1922 | 93.2 |
| Comparative Example 8 | $TiO_2$ | 1659 | 1456 | 87.7 |
| Comparative Example 9 | $WO_3$ | 2054 | 1917 | 93.4 |
| Comparative Example 10 | $V_2O_3$ | 1940 | 1529 | 78.8 |
| Comparative Example 11 | $SnO_2$ | 50 | Test was aborted | — |
| Comparative Example 12 | Fe | 1900 | 1725 | 90.7 |

TABLE 2

Two-Month Storage Test (Test of Sealed Battery)

| | Additive | Initial Capacity (mAh) | Post-storage Capacity (mAh) | Capacity Retention Ratio (%) |
|---|---|---|---|---|
| Example 1 | MgO | 2042 | 1987 | 97.3 |
| Comparative Example 1 | Blank | 2045 | 1862 | 91.0 |
| Comparative Example 2 | $MoO_3$ | 2063 | 1929 | 93.5 |
| Comparative Example 3 | $Bi_2O_3$ | 2058 | 1888 | 91.8 |
| Comparative Example 4 | $Sb_2O_3$ | 1980 | 1937 | 97.8 |
| Comparative Example 5 | $Y_2O_3$ | 2064 | 1887 | 91.4 |
| Comparative Example 6 | $Nb_2O_5$ | 2051 | 1905 | 92.9 |
| Comparative Example 7 | $ZrO_3$ | 2055 | 1856 | 90.3 |
| Comparative Example 8 | $TiO_2$ | 1713 | 1388 | 81.0 |
| Comparative Example 9 | $WO_3$ | 2068 | 1864 | 90.2 |
| Comparative Example 10 | $V_2O_3$ | 1924 | 1455 | 75.6 |
| Comparative Example 11 | $SnO_2$ | 13 | Test was aborted | — |
| Comparative Example 12 | Fe | 1908 | 1743 | 91.4 |

It is understood from the results in Tables 1 and 2 that the retention ratio of the post-storage capacity can be improved without impairing the initial discharge capacity only when MgO is added.

Further, as to Example 1 and Comparative Example 1, the results of Test Example 3 are shown in Table 3 and FIG. 1.

TABLE 3

Content of Fe in Positive Electrode after Storage Test (unit: % by mass)

| | Additive | Test Example 1 After (One-Month Storage) | Test Example 2 After (Two-Month Storage) |
|---|---|---|---|
| Example 1 | MgO | 0.010 | 0.012 |
| Comparative Example 1 | blank | 0.079 | 0.18 |

It is understood from the results in Table 3 and FIG. 1 that the content of iron in the positive electrode is decreased by adding magnesium to the negative electrode. Incidentally, the content of Fe in the positive electrode in Table 3 was determined by inductively-coupled plasma emission spectrometry.

Figure 2:
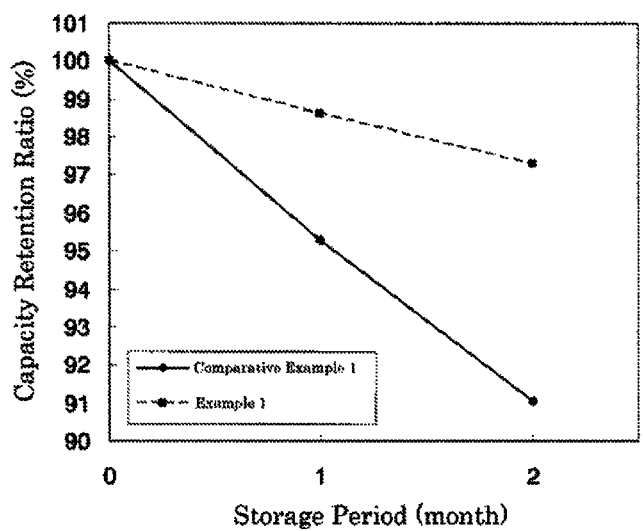
FIG. 2 is a graph showing the results of Test Examples 1 and 2 on Example 1 and Comparative Example 1.

Further, as to Example 1 and Comparative Example 1, the results of Test Examples 1 and 2 are shown in FIG. 2. In consideration of these results combined with the results in Test Example 3, there is a tendency that the capacity retention ratio is decreased as the content of Fe in the positive electrode increases.

Figure 3:
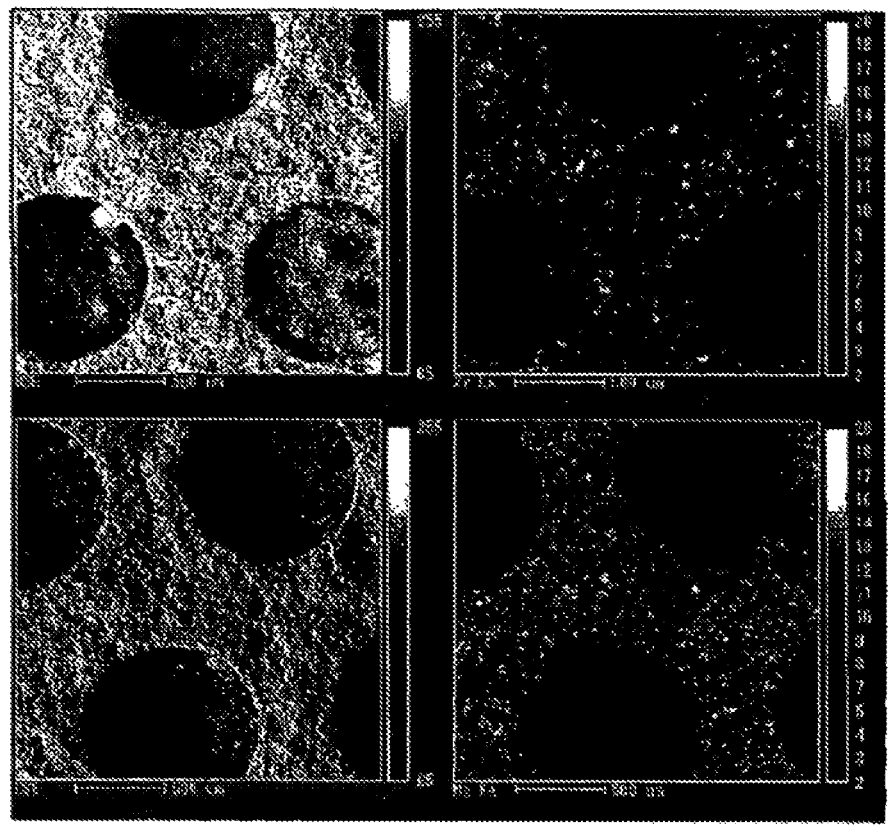
FIG. 3 shows BSE (backscattered electron) images and distribution of elements representing the results of Test Example 4 on Example 1 and Comparative Example 7. The left-hand drawings are BSE images of Example 1 (lower image) and Comparative Example 7 (upper image). Further, the upper right image indicates distribution of Zr in Comparative Example 7, and the lower right image indicates distribution of Mg in Example 1. The white portion is a portion where the substrate is present, and the large black portion is a hole bored in the substrate. Incidentally, measurement was performed within an area of 2 mm×2 mm.

Furthermore, as to Example 1 and Comparative Example 7, the results of Test Example 4 are shown in FIG. 3. Incidentally, in FIG. 3, the left-hand drawings are BSE images of Example 1 (lower image) and Comparative Example 7 (upper image). Further, the upper right image indicates distribution of Zr in Comparative Example 7, and the lower right image indicates distribution of Mg in Example 1. Large black depressions are holes bored in the substrate from the beginning.

In FIG. 3, since the hydrogen storage alloy layer has been scraped off, a substance dented in the substrate and the like are detected. Since MgO or $ZrO_2$ was added in an amount of only about 1.0% by mass in both of Example 1 and Comparative Example 7, usually, the substrate surface is interspersed with Mg or Zr as shown in the upper image (Comparative Example 7), but in the lower image (Example 1), Mg or Zr is distributed so as to cover the substrate surface. Thus, it is understood that magnesium is distributed so as to cover the substrate when MgO is used, and therefore a layer containing magnesium is formed on the substrate surface.

Example 2

A sealed battery of Example 2 was prepared in the same manner as in Example 1 except that the filling capacity of the positive electrode was changed to 1800 mAh and the filling capacity of the negative electrode was changed to 2300 mAh. Incidentally, in Example 2, the amount of MgO added was 1% by mass.

Test Example 5: One-Month Storage Test [Test of Sealed Battery]

After the prepared sealed battery was stored at 45° C. for one month in a state in which the sealed battery had been discharged, the charge-discharge cycle of the sealed battery was repeated three times under the same conditions as in the paragraph (Preparation of Sealed Battery and Test Conditions Therefor) of Example 1. In this case, the discharge capacity at the initial third cycle was defined as an initial capacity, and the discharge capacity at the third cycle after storage was defined as a post-storage capacity, and these capacities were compared with each other. Further, the ratio (%) of the post-storage capacity to the initial capacity was taken as the capacity retention ratio.

Test Example 6: Internal Resistance [Test of Sealed Battery]

The charge-discharge cycle of the prepared sealed battery was repeated three times under the same conditions as in the paragraph (Preparation of Sealed Battery and Test Conditions Therefor) of Example 1. Thereafter, the internal resistance of the sealed battery after discharge was measured.

Comparative Example 13

A sealed battery of Comparative Example 13 was prepared in the same manner as in Example 2 except that MgO was not used. Incidentally, in Example 2, the amount of MgO added is 0% by weight.

Example 3

A sealed battery of Example 3 was prepared in the same manner as in Example 2 except that the amount of MgO added was changed to 0.1% by mass.

Example 4

A sealed battery of Example 4 was prepared in the same manner as in Example 2 except that the amount of MgO added was changed to 0.3% by mass.

Example 5

A sealed battery of Example 5 was prepared in the same manner as in Example 2 except that the amount of MgO added was changed to 0.5% by mass.

Example 6

A sealed battery of Example 6 was prepared in the same manner as in Example 2 except that the amount of MgO added was changed to 3% by mass.

Figure 4:
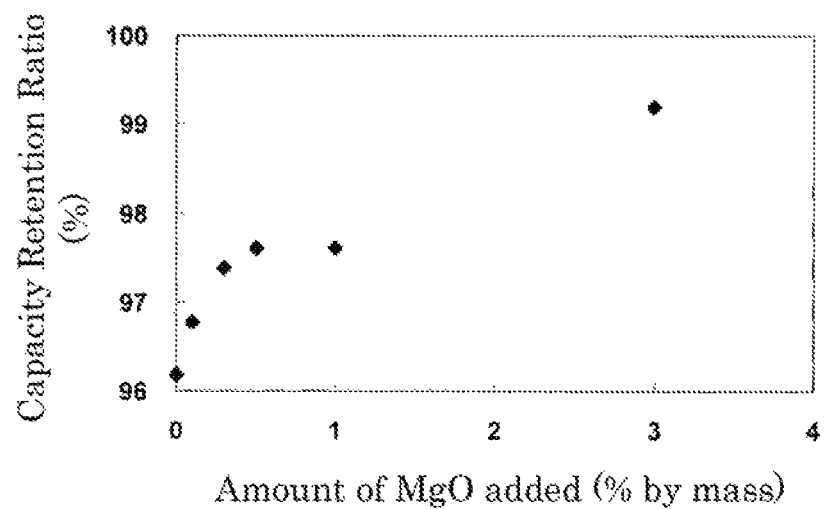
FIG. 4 is a graph showing the results of Test Example 5 on Examples 2 to 6 and Comparative Example 13.
Figure 5:
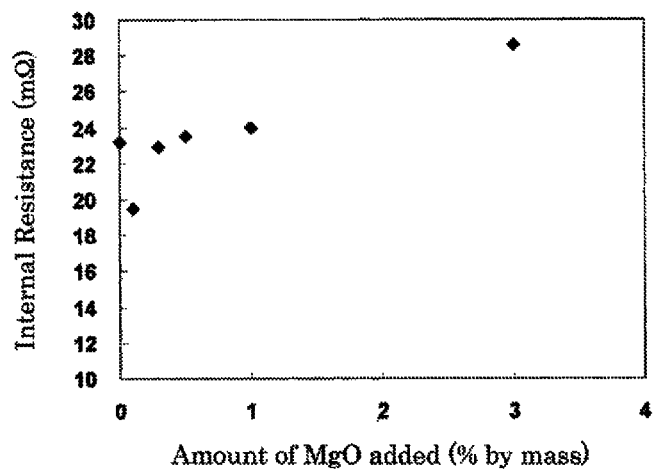
FIG. 5 is a graph showing the results of Test Example 6 on Examples 2 to 6 and Comparative Example 13.

As to Examples 2 to 6 and Comparative Example 13, the results of Test Example 5 are shown in Table 4 and FIG. 4, and the results of Test Example 6 are shown in Table 5 and FIG. 5.

TABLE 4

One-Month Storage Test (Test Of Sealed Battery)

| | Amount of MgO Added (% by mass) | Initial Capacity (mAh) | Post-storage Capacity (mAh) | Capacity Retention Ratio (%) |
|---|---|---|---|---|
| Example 2 | 1 | 1835 | 1791 | 97.6 |
| Example 3 | 0.1 | 1830 | 1771 | 96.8 |
| Example 4 | 0.3 | 1833 | 1785 | 97.4 |
| Example 5 | 0.5 | 1842 | 1798 | 97.6 |
| Example 6 | 3 | 1738 | 1724 | 99.2 |
| Comparative Example 13 | 0 | 1833 | 1763 | 96.2 |

TABLE 5

Internal Resistance (Test of Sealed Battery)

| | Amount of MgO Added (% by mass) | Internal Resistance (mΩ) |
|---|---|---|
| Example 2 | 1 | 24.0 |
| Example 3 | 0.1 | 19.5 |
| Example 4 | 0.3 | 22.9 |
| Example 5 | 0.5 | 23.5 |
| Example 6 | 3 | 28.6 |
| Comparative Example 13 | 0 | 23.2 |

It is understood from the results in Table 4 and FIG. 4 that the capacity retention ratio increases as the amount of MgO added is increased. Further, when the amount of MgO added is 3% by mass or less, particularly 1% by mass or less, it becomes possible to avoid lowering of the initial capacity. Further, from the results in Table 5 and FIG. 5, when the amount of MgO added is 3% by mass or less, particularly 1% by mass or less, it becomes possible to avoid an increase in the internal resistance.

Example 7

A hydrogen storage alloy electrode and a nickel electrode were prepared in the same manner as in Example 1 except that the thickness of nickel plating was changed to 0.25 μm and the amount of MgO added was changed to 0.3% by mass in preparing the hydrogen storage alloy electrode.

(Preparation of Open Type Cell and Test Conditions Therefor)

Separators were disposed on both sides of a positive electrode, that is, the nickel electrode, and the resultant was sandwiched between two hydrogen storage alloy electrodes to form a cell. An alkaline electrolyte solution containing 6.8 mol/L KOH was poured into the cell to such an extent that the electrode was adequately immersed in the electrolyte solution to form an open type cell.

Charging was performed at a rate of 0.1 ItA with respect to the positive electrode for 15 hours. Discharging was performed at a rate of 0.2 ItA, and cut at the time point when the potential of the positive electrode reached 0 V relative to the potential of a reference electrode (Hg/HgO electrode). Further, a rest time of 1 hour was provided between charging and discharging. The measured temperature at that time was 20° C. The charge-discharge cycle was repeated ten times under these conditions, and it was verified that the capacity of the positive electrode exhibited 500 mAh.

Test Example 7: Two-Week Storage Test [Test of Electrode Plate]

After the prepared open type cell was stored at 45° C. for two weeks (in a state in which the cell had been discharged after 10 cycles of charge-discharge), the charge-discharge cycle of the cell was repeated three times under the same conditions as in the above-mentioned paragraph (Preparation of Open Type Cell and Test Conditions Therefor). In this case, the discharge capacity at the initial tenth cycle was defined as an initial capacity, and the discharge capacity at the third cycle after storage was defined as a post-storage capacity, and the ratio (%) of the post-storage capacity to the initial capacity was taken as the capacity retention ratio. Incidentally, in the following Examples 8 to 9 and 12, Comparative Examples 15 to 18 and 20 to 21, and Reference Examples 1 to 2, substrates were prepared by varying the thickness of plating under the conditions in which there were no defects with a plating thickness of 3 µm.

Example 8

An open type cell of Example 8 was prepared in the same manner as in Example 7 except that the thickness of nickel plating was changed to 0.5 µm in preparing the hydrogen storage alloy electrode.

Example 9

An open type cell of Example 9 was prepared in the same manner as in Example 7 except that the thickness of nickel plating was changed to 1 µm in preparing the hydrogen storage alloy electrode.

Example 10

An open type cell of Example 10 was prepared in the same manner as in Example 7 except that the substrate was not nickel-plated (thickness: 0 µm) in preparing the hydrogen storage alloy electrode.

Example 11

An open type cell of Example 11 was prepared in the same manner as in Example 7 except that the substrate was not nickel-plated (thickness: 0 µm) and the amount of MgO added was changed to 0.5% by mass in preparing the hydrogen storage alloy electrode.

Example 12

An open type cell of Example 12 was prepared in the same manner as in Example 7 except that the thickness of nickel plating was changed to 2 µm in preparing the hydrogen storage alloy electrode.

Example 13

An open type cell of Example 13 was prepared in the same manner as in Example 7 except that the thickness of nickel plating was changed to 3 µm in preparing the hydrogen storage alloy electrode.

Example 14

An open type cell of Example 14 was prepared in the same manner as in Example 7 except that a product in which the number of mottles per 10 cm$^2$ is about 200 based on the ferroxyle test according to Japanese Industrial Standards JIS H 8617 was used as a substrate (thickness before plating: 45 µm) made of a holed steel sheet which had been subjected to nickel plating (thickness: 3 µm) and which has defects, in preparing the hydrogen storage alloy electrode.

Example 15

An open type cell of Example 15 was prepared in the same manner as in Example 7 except that a product in which the number of mottles per 10 cm$^2$ is about 200 based on the ferroxyle test according to Japanese Industrial Standards JIS H 8617 was used as a substrate (thickness before plating: 45 µm) made of a holed steel sheet which had been subjected to nickel plating (thickness: 3 µm) and which has defects, and that the amount of MgO added was changed to 1% by mass in preparing the hydrogen storage alloy electrode.

Comparative Example 14

An open type cell of Comparative Example 14 was prepared in the same manner as in Example 7 except that the substrate was not plated (thickness: 0 µm) and MgO (0% by mass) was not added in preparing the hydrogen storage alloy electrode.

Comparative Example 15

An open type cell of Comparative Example 15 was prepared in the same manner as in Example 7 except that MgO was not added (0% by mass) in preparing the hydrogen storage alloy electrode.

Comparative Example 16

An open type cell of Comparative Example 16 was prepared in the same manner as in Example 7 except that the thickness of nickel plating was changed to 0.5 µm and MgO was not added (0% by mass) in preparing the hydrogen storage alloy electrode.

Comparative Example 17

An open type cell of Comparative Example 17 was prepared in the same manner as in Example 7 except that the thickness of nickel plating was changed to 1 µm and MgO was not added (0% by mass) in preparing the hydrogen storage alloy electrode.

Comparative Example 18

An open type cell of Comparative Example 18 was prepared in the same manner as in Example 7 except that the thickness of nickel plating was changed to 2 µm and MgO was not added (0% by mass) in preparing the hydrogen storage alloy electrode.

Comparative Example 19

An open type cell of Comparative Example 19 was prepared in the same manner as in Example 7 except that the thickness of nickel plating was changed to 3 µm and MgO was not added (0% by mass) in preparing the hydrogen storage alloy electrode.

Comparative Example 20

An open type cell of Comparative Example 20 was prepared in the same manner as in Example 7 except that the thickness of nickel plating was changed to 4 µm and MgO was not added (0% by mass) in preparing the hydrogen storage alloy electrode.

Comparative Example 21

An open type cell of Comparative Example 21 was prepared in the same manner as in Example 7 except that the thickness of nickel plating was changed to 5 µm and MgO was not added (0% by mass) in preparing the hydrogen storage alloy electrode.

Comparative Example 22

An open type cell of Comparative Example 22 was prepared in the same manner as in Example 7 except that a product in which the number of mottles per 10 cm² is about 200 based on the ferroxyle test according to Japanese Industrial Standards JIS H 8617 was used as a substrate (thickness before plating: 45 μm) made of a holed steel sheet which had been subjected to nickel plating (thickness: 3 μm) and which has defects, and that MgO was not added (0% by mass) in preparing the hydrogen storage alloy electrode.

Reference Example 1

An open type cell of Reference Example 1 was prepared in the same manner as in Example 7 except that the thickness of nickel plating was changed to 4 μm in preparing the hydrogen storage alloy electrode.

Reference Example 2

An open type cell of Reference Example 2 was prepared in the same manner as in Example 7 except that the thickness of nickel plating was changed to 5 μm in preparing the hydrogen storage alloy electrode.

Figure 6:
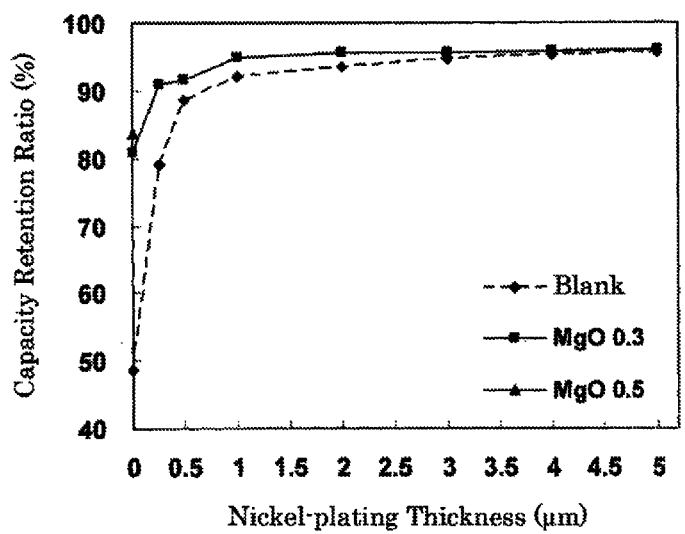
FIG. 6 is a graph showing the results of Test Example 7 on Examples 7 to 13, Comparative Examples 14 to 21 and Reference Examples 1 to 2.
Figure 7:
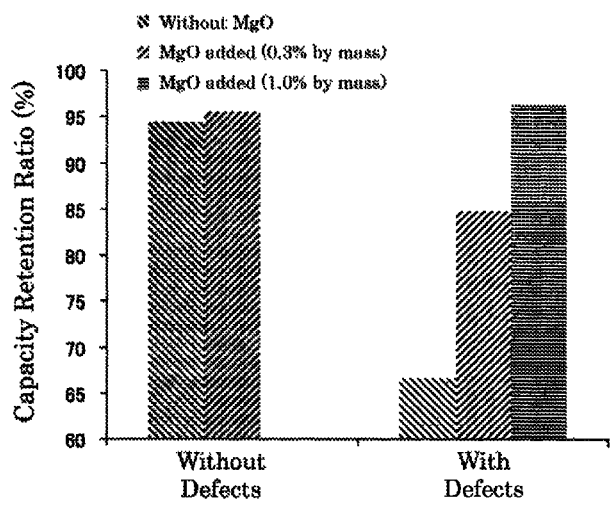
FIG. 7 is a graph showing the results of Test Example 7 on Examples 13 to 15 and Comparative Examples 19 and 22.

As to Examples 7 to 15, Comparative Examples 14 to 22 and Reference Examples 1 to 2, the results of Test Example 7 are shown in Tables 6 to 7 and FIGS. 6 to 7 (the results of Examples 7 to 13, Comparative Examples 14 to 21 and Reference Examples 1 to 2 are shown in Table 6, the results of Examples 13 to 15 and Comparative Examples 19 and 22 are shown in Table 7, the results of Examples 7 to 14, Comparative Examples 14 to 21 and Reference Examples 1 to 2 are shown in FIG. 6, and the results of Examples 13 to 15 and Comparative Examples 19 and 22 are shown in FIG. 7).

TABLE 6

Two-Week Storage Test (Test of Electrode Plate)
Thickness of Nickel Plating

| | Thickness of Nickel Plating (μm) | Amount of MgO Added (% by weight) | Capacity Retention Ratio (%) |
|---|---|---|---|
| Example 7 | 0.25 | 0.3 | 90.9 |
| Example 8 | 0.5 | 0.3 | 91.7 |
| Example 9 | 1 | 0.3 | 94.9 |
| Example 10 | 0 | 0.3 | 80.9 |
| Example 11 | 0 | 0.5 | 83.8 |
| Example 12 | 2 | 0.3 | 95.5 |
| Example 13 | 3 | 0.3 | 95.6 |
| Comparative Example 14 | 0 | 0 | 48.6 |
| Comparative Example 15 | 0.25 | 0 | 78.9 |
| Comparative Example 16 | 0.5 | 0 | 88.6 |
| Comparative Example 17 | 1 | 0 | 92.2 |
| Comparative Example 18 | 2 | 0 | 93.6 |
| Comparative Example 19 | 3 | 0 | 94.5 |
| Comparative Example 20 | 4 | 0 | 95.3 |
| Comparative Example 21 | 5 | 0 | 95.7 |
| Reference Example 1 | 4 | 0.3 | 95.9 |
| Reference Example 2 | 5 | 0.3 | 96.0 |

TABLE 7

Two-Week Storage Test (Test of Electrode Plate)
Presence or Absence of Defect

| | Thickness of Nickel Plating (μm) | Defect in Nickel Plating | Amount of MgO Added (% by weight) | Capacity Retention Ratio (%) |
|---|---|---|---|---|
| Example 13 | 3 | Absent | 0.3 | 95.6 |
| Example 14 | 3 | Present | 0.3 | 84.9 |
| Example 15 | 3 | Present | 1 | 96.3 |
| Comparative Example 19 | 3 | Absent | 0 | 94.5 |
| Comparative Example 22 | 3 | Present | 0 | 66.6 |

Incidentally, a test of sealed battery was performed in the same manner as in the test of electrode plate of Test Example 7, and consequently the same results as in the test of electrode plate of Test Example 7 shown in Tables 6 to 7 and FIGS. 6 to 7 were obtained.

From the results in Tables 6 to 7 and FIGS. 6 to 7, a significant effect of improving the capacity retention ratio is recognized for the case where magnesium was added particularly when there was no nickel plating layer, the thickness of the nickel plating layer was small, or the nickel plating layer had defects, that is, the case where the elution of iron tends to occur. This effect is more remarkable in the case where the nickel plating layer is not formed, or the nickel plating layer has a result.

Example 16: Coating on Substrate (Preparation of Nickel Electrode)

A nickel electrode was prepared in the same manner as in Example 1.

(Preparation of Hydrogen Storage Alloy Electrode)

First, an MgO powder and an aqueous methyl cellulose (MC) solution serving as a thickener were mixed to prepare an MgO paste. The paste was applied onto nickel plating of a nickel-plated (substrate thickness: 46 μm, plating thickness: 3 μm) substrate made of a holed steel sheet, and then dried and rolled to form an MgO layer (10 g per square meter of substrate area). The amount of 10 g per square meter of substrate area corresponds to 0.5% by mass in the negative electrode. The same shall apply hereafter.

Then, a dispersion liquid of SBR (styrene-butadiene rubber) serving as a binder and an aqueous methyl cellulose (MC) solution serving as a thickener were added to a hydrogen storage alloy powder having an average particle size of 50 μm and the composition of $MmNi_{4.0}Co_{0.7}Al_{0.3}Mn_{0.3}$ (Mm indicates a misch metal), and the resulting mixture was kneaded to form a hydrogen storage alloy paste. The proportion of the hydrogen storage alloy to SBR (solid content) in this time was 99:1 (mass ratio). The paste was applied onto the formed MgO layer, and then dried and rolled to form a hydrogen storage alloy layer (thickness: 150 μm on one side), and the resultant was taken as an electrode sheet of a hydrogen storage alloy electrode, and the electrode sheet was cut into a size of 45 mm×65 mm to form a hydrogen storage alloy electrode. Incidentally, the filling capacity of the hydrogen storage alloy electrode (amount of hydrogen storage alloy electrode powder used for filling×capacity per unit mass of hydrogen storage alloy powder) was 1000 mAh.

(Preparation of Open Type Cell and Test Conditions Therefor)

Separators were disposed on both sides of a positive electrode, that is, the nickel electrode, and the resultant was sandwiched between two hydrogen storage alloy electrodes to form a cell. An alkaline electrolyte solution containing 6.8 mol/L KOH was poured into the cell to such an extent that the electrode was adequately immersed in the electrolyte solution to prepare an open type cell of Example 16.

Charging was performed at a rate of 0.1 ItA for 15 hours for the positive electrode. Discharging was performed at a rate of 0.2 ItA, and cut at the time point when the potential of the positive electrode reached 0 V relative to the potential of a reference electrode (Hg/HgO electrode). Further, a rest time of 1 hour was provided between charging and discharging. The measured temperature at that time was 20° C. The charge-discharge cycle was repeated a predetermined number of times under these conditions, and it was verified that the capacity of the positive electrode exhibited 500 mAh.

Test Example 8: Test of Electrode Plate of Negative Electrode

The test of the negative electrode plate was performed as follows.

The electrode sheet of the negative electrode thus obtained was cut into a size of 3 cm×3.3 cm to form a negative electrode plate. Further, a sintering type nickel hydroxide electrode having a capacity three times as large as that of the negative electrode was used for the positive electrode plate. The negative electrode was sandwiched between the positive electrodes with a separator interposed therebetween, these electrodes were fixed, a 6.8 M aqueous solution of potassium hydroxide was poured, and thereby an open type cell was assembled. Using this cell, charging was performed at a rate of 0.1 ItA at 20° C. for 15 hours, and after a rest time of 1 hour, discharging was performed at a rate of 0.2 ItA up to −0.6 V relative to the potential of a Hg/HgO reference electrode. This charge-discharge cycle was repeated ten times, and the discharge capacity at the tenth cycle was measured.

Test Example 9: Positive Electrode Storage Test [Test of Electrode Plate]

The positive electrode storage test was performed as follows.

Using the open type cell prepared above, the charge-discharge cycle of the cell was repeated five times under the conditions described above, and the cell was stored at 45° C. for four weeks, and then the charge-discharge cycle of the cell was further repeated three times under the same conditions as in the above-mentioned paragraph (Preparation of Open Type Cell and Test Conditions Therefor). In this case, the positive electrode discharge capacity at the initial fifth cycle was defined as an initial capacity, and the positive electrode discharge capacity at the third cycle after storage was defined as a post-storage capacity, and the ratio (%) of the post-storage capacity to the initial capacity was taken as the capacity retention ratio.

Example 17: Coating on Substrate (Preparation of Hydrogen Storage Alloy Electrode)

First, a dispersion liquid of SBR (styrene-butadiene rubber) serving as a binder and an aqueous methyl cellulose (MC) solution serving as a thickener were added to a hydrogen storage alloy powder having an average particle size of 50 μm and the composition of $MmNi_{4.0}Co_{0.7}Al_{0.3}Mn_{0.3}$ (Mm indicates a misch metal), and the resulting mixture was kneaded to form a hydrogen storage alloy paste. The proportion of the hydrogen storage alloy to SBR (solid content) in this time was 99:1 (mass ratio). The paste was applied onto nickel plating of a nickel-plated (substrate thickness: 45 μm, plating thickness: 3 μm) substrate made of a holed steel sheet, and then dried and rolled to form a hydrogen storage alloy layer (thickness: 150 μm on one side).

Next, an MgO powder and an aqueous methyl cellulose (MC) solution serving as a thickener were mixed to prepare an MgO paste. The paste was applied onto the formed hydrogen storage alloy layer, and then dried and rolled to form a MgO layer (10 g per square meter of substrate area), and the resultant was taken as an electrode sheet of a hydrogen storage alloy electrode, and the electrode sheet was cut into a size of 45 mm×65 mm to form a hydrogen storage alloy electrode. Incidentally, the filling capacity of the hydrogen storage alloy electrode (amount of hydrogen storage alloy electrode powder used for filling×capacity per unit mass of hydrogen storage alloy powder) was 1000 mAh.

(Preparation of Open Type Cell and Test Conditions Therefor)

An open type cell of Example 17 was prepared in the same manner as in Example 16 except that the hydrogen storage alloy electrode prepared as described above was used. Further, test conditions are similar to those in Example 16.

Comparative Example 23: Blank (Preparation of Hydrogen Storage Alloy Electrode)

A dispersion liquid of SBR (styrene-butadiene rubber) serving as a binder and an aqueous methyl cellulose (MC) solution serving as a thickener were added to a hydrogen storage alloy powder having an average particle size of 50 μm and the composition of $MmNi_{4.0}Co_{0.7}Al_{0.3}Mn_{0.3}$ (Mm indicates a misch metal), and the resulting mixture was kneaded to form a hydrogen storage alloy paste. The proportion of the hydrogen storage alloy to SBR (solid content) in this time was 99:1 (mass ratio). The paste was applied onto nickel plating of a nickel-plated (substrate thickness: 45 μm, plating thickness: 3 μm) substrate made of a holed steel sheet, and then dried and rolled to form a hydrogen storage alloy layer (thickness: 150 μm on one side), and the resultant was taken as an electrode sheet of a hydrogen storage alloy electrode, and the electrode sheet was cut into a size of 45 mm×65 mm to form a hydrogen storage alloy electrode. Incidentally, the filling capacity of the hydrogen storage alloy electrode (amount of hydrogen storage alloy electrode powder used for filling×capacity per unit mass of hydrogen storage alloy powder) was 1000 mAh.

(Preparation of Open Type Cell and Test Conditions Therefor)

An open type cell of Comparative Example 23 was prepared in the same manner as in Example 16 except that the hydrogen storage alloy electrode prepared as described above was used. Further, test conditions are similar to those in Example 16.

Example 18: Mixing (Preparation of Hydrogen Storage Alloy Electrode)

First, a hydrogen storage alloy powder having an average particle size of 50 μm and the composition of $MmNi_{4.0}Co_{0.7}Al_{0.3}Mn_{0.3}$ (Mm indicates a misch metal) and an MgO powder were mixed. Then, to the resulting mixture, a dispersion liquid of SBR (styrene-butadiene rubber) serving as a binder and an aqueous methyl cellulose (MC) solution serving as a thickener were added, and the resulting mixture was kneaded to form a negative electrode paste. The proportion among the hydrogen storage alloy, MgO and SBR (solid content) in this time was 98:1:1 (mass ratio) (the content of MgO was 10 g per square meter of substrate area). The paste was applied onto a nickel-plated (substrate thickness: 45 μm, plating thickness: 3 μm) substrate made of a holed steel sheet, and then dried and rolled to form an electrode sheet of a hydrogen storage alloy electrode, and the electrode sheet was cut into a size of 45 mm×65 mm to form a hydrogen storage alloy electrode. Incidentally, the filling capacity of the hydrogen storage alloy electrode (amount of hydrogen storage alloy electrode powder used for filling×capacity per unit mass of hydrogen storage alloy powder) was 1000 mAh.

(Preparation of Open Type Cell and Test Conditions Therefor)

An open type cell of Comparative Example 24 was prepared in the same manner as in Example 16 except that the hydrogen storage alloy electrode prepared as described above was used. Further, test conditions are similar to those in Example 16.

Figure 8:
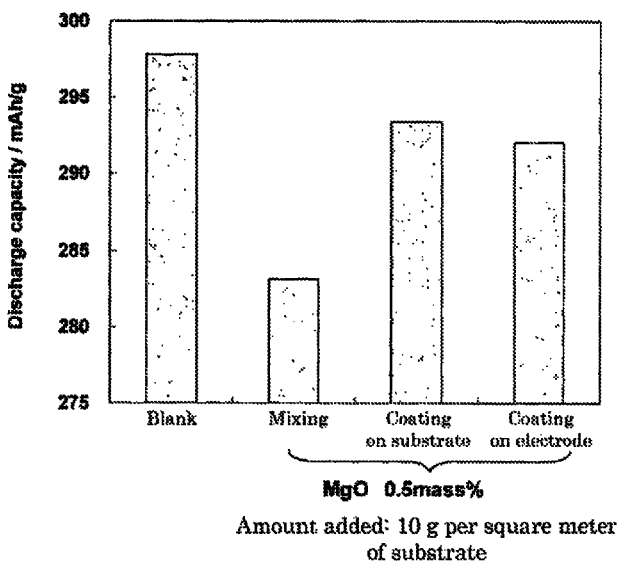
FIG. 8 is a graph showing the results of Test Example 8 on Examples 16 to 18 and Comparative Example 23.
Figure 9:
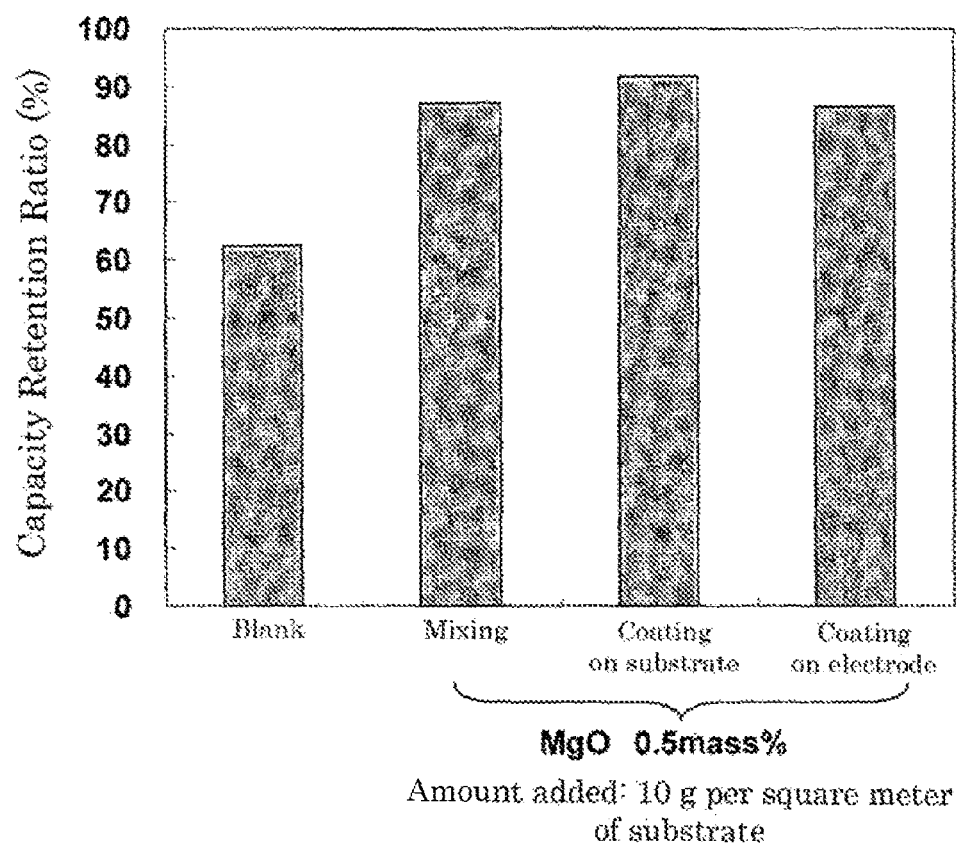
FIG. 9 is a graph showing the results of Test Example 9 on Examples 16 to 18 and Comparative Example 23.

As to Examples 16 to 18 and Comparative Example 23, the results of the negative electrode discharge capacity and the positive electrode capacity retention ratio of Test Examples 8 and 9 are shown in Table 8 and FIGS. 8 to 9.

TABLE 8

Test of Electrode Plate of Negative Electrode and Positive Electrode Storage Test

| | Addition Form of MgO | Negative Electrode Discharge Capacity (mAh/g) | Positive Electrode Capacity Retention Ratio (%) |
|---|---|---|---|
| Example 16 | Coating on substrate | 293 | 91.5 |
| Example 17 | Coating on electrode | 292 | 86.5 |
| Example 18 | Mixing | 283 | 87.1 |
| Comparative Example 23 | Blank (without MgO) | 298 | 62.6 |

It is understood from the results in Table 8 and FIGS. 8 to 9 that in the case of Examples 16 to 17, storage property of the positive electrode capacity and deactivation of the negative electrode can be achieved simultaneously more favorably than in the case of simply mixing MgO (Example 18).

The invention claimed is:

1. A negative electrode for an alkaline secondary battery comprising a current collecting substrate having a substrate containing iron,
   wherein the current collecting substrate does not have a conductive protecting layer, or the current collecting substrate has a conductive protecting layer having a thickness of 3 μm or less on the current collecting substrate, or the current collecting substrate has, on the current collecting substrate, a conductive protecting layer having defects,
   wherein the negative electrode contains magnesium or a magnesium compound and a hydrogen storage alloy, and
   wherein the content of magnesium or the magnesium compound is 0.1 to 3.0% by mass with respect to the total amount of the hydrogen storage alloy and magnesium or the magnesium compound in the negative electrode.

2. The negative electrode for an alkaline secondary battery according to claim 1, wherein the protecting layer comprises nickel.

3. The negative electrode for an alkaline secondary battery according to claim 1, wherein the protecting layer is a plating film.

4. The negative electrode for an alkaline secondary battery according to claim 1, wherein a hydrogen storage alloy layer is further formed on the current collecting substrate.

5. The negative electrode for an alkaline secondary battery according to claim 4, wherein the hydrogen storage alloy layer contains magnesium or a magnesium compound and a hydrogen storage alloy.

6. The negative electrode for an alkaline secondary battery according to claim 1, wherein a magnesium compound layer is formed on the current collecting substrate.

7. The negative electrode for an alkaline secondary battery according to claim 6, wherein the magnesium compound layer is formed directly on the current collecting substrate.

8. The negative electrode for an alkaline secondary battery according to claim 1, wherein a magnesium compound layer and a hydrogen storage alloy layer are formed on the current collecting substrate.

9. The negative electrode for an alkaline secondary battery according to claim 1, wherein a magnesium layer is formed on the current collecting substrate when the negative electrode is observed by using an electron probe microanalyzer.

10. The negative electrode for an alkaline secondary battery according to claim 1, wherein the magnesium compound is magnesium oxide.

11. The negative electrode for an alkaline secondary battery according to claim 1, wherein the current collecting substrate has the conductive protecting layer having a thickness of 0.25 μm or less on the current collecting substrate.

12. The negative electrode for an alkaline secondary battery according to claim 1, wherein the current collecting substrate does not have a conductive protecting layer.

13. The negative electrode for an alkaline secondary battery according to claim 1, wherein the current collecting substrate has the conductive protecting layer having the thickness of 3 μm or less on the current collecting substrate.

14. The negative electrode for an alkaline secondary battery according to claim 1, wherein the current collecting substrate has, on the current collecting substrate, the conductive protecting layer having defects.

15. An alkaline secondary battery comprising the negative electrode for an alkaline secondary battery according to claim 1.

* * * * *